(12) United States Patent
Kabeya et al.

(10) Patent No.: US 11,505,156 B2
(45) Date of Patent: Nov. 22, 2022

(54) AIRBAG COVERS AND THE MANUFACTURING METHODS THEREOF; AIRBAG DEVICES

(71) Applicant: AUTOLIV DEVELOPMENT AB, Vargarda (SE)

(72) Inventors: Takumi Kabeya, Kanagawa (JP); Yuto Kobayashi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 168 days.

(21) Appl. No.: 17/264,903

(22) PCT Filed: Jul. 4, 2019

(86) PCT No.: PCT/JP2019/026674
§ 371 (c)(1),
(2) Date: Feb. 1, 2021

(87) PCT Pub. No.: WO2020/026695
PCT Pub. Date: Feb. 6, 2020

(65) Prior Publication Data
US 2021/0300284 A1  Sep. 30, 2021

(30) Foreign Application Priority Data
Aug. 3, 2018 (JP) .............................. JP2018-146407

(51) Int. Cl.
*B60R 21/207* (2006.01)
*B60R 21/201* (2011.01)
(Continued)

(52) U.S. Cl.
CPC .......... *B60R 21/207* (2013.01); *B60R 21/201* (2013.01); *B60R 21/213* (2013.01); *B60R 21/235* (2013.01); *B60R 2021/23509* (2013.01)

(58) Field of Classification Search
None
See application file for complete search history.

(56) References Cited

U.S. PATENT DOCUMENTS

| 5,498,030 A | 3/1996 | Hill et al. |
| 2002/0190509 A1 | 12/2002 | Higashi |

(Continued)

FOREIGN PATENT DOCUMENTS

| CN | 107428303 A | 12/2017 |
| CN | 107428306 A | 12/2017 |

(Continued)

*Primary Examiner* — Faye M Fleming
(74) *Attorney, Agent, or Firm* — Harness, Dickey & Pierce, P.L.C.; Stephen T. Olson

(57) ABSTRACT

An airbag cover, a method for manufacturing the same, and an airbag device in which a wound or folded cushion can be stowed in a shape so as to fit in a prescribed location in a vehicle cabin, and which can protect the cushion from an obstacle. An airbag cover that encloses a bag-like cushion that is wound or folded and stowed within a vehicle cabin and expands and deploys using gas supplied from a built-in inflater, wherein the airbag cover includes a first base material made from a plain woven fabric or non-woven fabric made of synthetic fibers, and a second base material integrally bonded to the first base material and having a higher initial tensile resistance value than that of the first base material.

19 Claims, 10 Drawing Sheets

(51) Int. Cl.
    *B60R 21/235*    (2006.01)
    *B60R 21/213*    (2011.01)

(56) References Cited

U.S. PATENT DOCUMENTS

| | | |
|---|---|---|
| 2009/0051145 A1 | 2/2009 | Hill et al. |
| 2018/0050653 A1 | 2/2018 | Shimizu et al. |
| 2018/0111579 A1 | 4/2018 | Shimizu et al. |

FOREIGN PATENT DOCUMENTS

| | | | | |
|---|---|---|---|---|
| EP | 2028065 A2 | 2/2009 | | |
| EP | 3284637 A1 | 2/2018 | | |
| EP | 3287327 A1 | 2/2018 | | |
| EP | 3476666 A1 | 5/2019 | | |
| EP | 3476667 A1 | 5/2019 | | |
| GB | 2452079 A | 2/2009 | | |
| JP | H09123861 A * | 5/1997 | ……… | B60R 21/207 |
| JP | 2001-158320 A | 6/2001 | | |
| JP | 2015-74295 A | 4/2015 | | |
| KR | 10-2017-0109029 A | 9/2017 | | |
| KR | 10-2017-0110115 A | 10/2017 | | |
| WO | 1996/030233 A1 | 10/1996 | | |
| WO | WO-0006426 A1 * | 2/2000 | ……… | B60R 21/207 |
| WO | 2016/167087 A1 | 10/2016 | | |
| WO | 2016/170892 A1 | 10/2016 | | |

\* cited by examiner

Perspective A

| No. | Adhering surface | Heating Temperature (°C) | Heating Time (s) | Adhesion | Force required for separation (N) |
|---|---|---|---|---|---|
| 1 | No coating | 150 | 20 | OK | 87.5 |
| 2 | No coating | 150 | 100 | OK | 197.9 |
| 3 | 25 g coat | 150 | 20 | NG | — |
| 4 | 25 g coat | 150 | 100 | NG | — |
| 5 | No coating | 180 | 20 | OK | 209.4 |
| 6 | No coating | 180 | 100 | OK | 214.6 |
| 7 | 25 g coat | 180 | 20 | NG | — |
| 8 | 25 g coat | 180 | 100 | NG | — |

[FIG. 8]
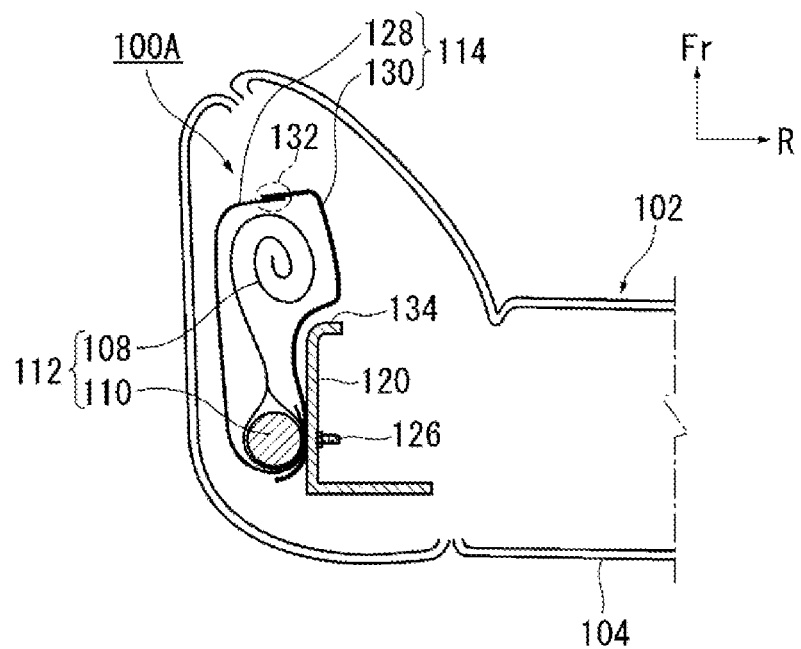

J-J

AIRBAG COVERS AND THE MANUFACTURING METHODS THEREOF; AIRBAG DEVICES

TECHNICAL FIELD

The present invention is related to an airbag cover that encloses a cushion that is stowed in a vehicle cabin and expands and deploys for the purpose of protecting an occupant in an emergency, a method for manufacturing the same, and an airbag device provided with the airbag cover.

BACKGROUND

An airbag device is a safety device that is operated in an emergency such as a vehicle collision and, for example, includes a bag shaped cushion. The cushion is expanded and deployed by gas in case of an emergency in order to catch and protect a passenger. There are various types of airbag devices depending on the installation site and application. Examples include side airbags that expand and deploy from a side part of a vehicle seat to a side part of an occupant, and curtain airbags that expand and deploy along the side window from the vicinity of the ceiling of the vehicle body sidewall in the vehicle cabin to protect the occupant from a side collision or subsequent rollover (falling over sideways).

The cushion is wound or folded and stowed in a prescribed location in the vehicle cabin, and expands and deploys in an emergency using gas supplied from a built-in inflater. Patent Document 1 describes an airbag cover that encloses a folded cushion.

RELATED ART DOCUMENTS

Patent Documents

Patent Document 1: Japanese Unexamined Patent Application 2015-74295

SUMMARY OF THE INVENTION

Problem to be Solved by the Invention

When the wound or folded cushion is stowed in a prescribed location within the vehicle cabin, the cushion is preferably stowed in a shape that fits at a prescribed location to stabilize the deployment behavior, protect the cushion from obstruction, and prevent defects such as bursts. Obstacles may include the edges of the seat frame in the case of a side airbag device, or the roof side rails that serve as side walls of the vehicle body in the case of a curtain airbag device.

The airbag cover described in Patent Document 1 encloses a folded cushion and only breaks due to expansion and deployment of the cushion. Therefore, the airbag cover of Patent Document 1 has room for improvement with respect to storing a folded cushion in a shape that fits a prescribed location, or protecting the cushion from an obstacle.

In light of the problems described above, an object of the present invention is to provide an airbag cover, a method for manufacturing the same, and an airbag device in which a wound or folded cushion can be stowed in a shape so as to fit in a prescribed location within a vehicle cabin, and which can protect the cushion from an obstacle.

Means for Solving the Problem

In order to solve the problems described above, a representative configuration of an airbag cover according to the present invention is an airbag cover that wraps around a bag-like cushion that is wound or folded and stowed within a vehicle cabin and expands and deploys using gas supplied from a built-in inflater. The airbag cover includes a first base material made from a plain woven fabric or non-woven fabric made of synthetic fibers, and a second base material integrally bonded to the first base material and having a higher initial tensile resistance value than that of the first base material. Here, the initial tensile resistance value is a value indicated by the tensile strength when a prescribed fabric shape is elongated 5% using a prescribed tensile tester to pull the fabric under prescribed conditions.

According to the configuration described above, the first base material and the second base material having different initial tensile resistance values are integrally bonded to form an airbag cover. Since the first base material and the second base material are capable of maintaining the shape thereof, in terms of the nature of the present invention, the wound or folded cushion can be stowed in a shape that fits a prescribed location in the vehicle cabin.

In particular, the first base material may be a plain woven fabric or non-woven fabric made of synthetic fibers, for example, and with an initial tensile resistance value lower than that of the second base material, the base material can easily deform following the shape of the prescribed location in which the cushion is to be stowed. Thus, the first base material is proficient in keeping the cushion in a desired stowed state. Also, providing a slit or the like in the soft first base material enables a way of reliably breaking the cushion without inhibiting expansion and deployment of the cushion, such that the expansion behavior of the cushion can be stabilized.

On the other hand, the second base material with an initial tensile resistance value that is relatively high is disposed on the side of the cushion close to an obstacle such as the edge of the seat frame, to protect the cushion from obstructions even when the cushion is stowed, but also when the cushion is expanded and deployed.

The first base material and the second base material described above should be bonded together by the polymer of the fibers of one of the base materials penetrating between the fibers of the other base material. As an example, the first base material and the second base material are overlaid and heated at a temperature higher than the melting temperature of one of the base materials, and polymers of one of the base materials, having fluidity, penetrate into the inside of the other base material. In this manner, the first base material and the second base material can be bonded by heat sealing.

For example, the first base material may be a plain woven fabric formed by weaving warp and weft fibers of nylon fiber or polyester fiber, or non-woven fabric made of nylon fibers, polyester fibers, or polypropylene fibers. Preferably, the first base material is a non-woven fabric of polyester fibers.

The first base material is preferably formed of a non-woven fabric containing at least one of rayon, nylon, polyester, polypropylene, acrylic, vinylon, aramid synthetic fibers, or glass fibers. The first base material can also be formed by such non-woven fabrics.

The second base material described above is preferably composed of a compressed body formed from a compressed ductile fabric material. Configuring the second base material to be a compressed body of a ductile fabric material in this manner enables increasing the initial tensile resistance value beyond that of the first base material.

The ductile fabric material described above is preferably a polymer non-woven fabric into which a single fiber is mixed, or a non-woven fabric containing a plurality of polymer fibers. The plurality of polymer fibers include a plurality of core and coating bi-component composite fibers, and the coating of the bi-component composite fibers may be fused together to have a stable post-molded shape. Furthermore, the core and coating bi-component composite fibers may be configured to have a core inside a polymer material having a prescribed melting point and an external coating of a polymer material having a melting point lower than this prescribed melting point. Furthermore, these plurality of polymer fibers may include a plurality of mono-component fibers. In addition, the mono-component composite fibers may be configured so as to have a melting point higher than the melting point of the external coating of the core and coating bi-component composite fiber. The second base material can be formed by using a non-woven fabric as this ductile fabric material.

The ductile fabric material described above may be a felt-like material. The second base material can be formed as a compressed body by using a felt-like material as the ductile fabric material in this manner. Note that when the second base material is formed of felt rather than plastic, the felt is softer than plastic, and can be deformed to follow the shape of a prescribed location in which the cushion is to be stowed, and in addition, weight reduction can be achieved. After molding, the felt material is a compressed body, a felt-derived member that has been fused and solidified by pressing. Therefore, the properties of the second base material, which is the final product, or in other words, the compressed body, made of post-molded felt material, is softer and more flexible than solid plastic and more rigid than the starting felt material.

The ductile fabric material described above may be formed of polyester fibers. The second base material can be formed by using polyester fibers as the ductile fabric material in this manner.

The second base material preferably includes fibers having a melting point that differs by 30° C. or more from the melting point of the fibers included in the first base material. The second base material can be formed by including such fibers.

The airbag cover described above may be provided separately from an airbag module composed of an inflater and a cushion that includes the inflater. By providing the airbag cover separately from the airbag module, the airbag cover can be manufactured and then wound around to enclose the airbag module. Thus, the airbag cover can be produced in a separate location from the airbag module.

In order to solve the problems described above, a representative configuration of the airbag device according to the present invention includes the airbag cover described above and a cushion that encloses the airbag cover.

According to the configuration described above, an airbag device can be fabricated using the airbag cover described above to enclose a cushion in which an inflater is built in.

The airbag device described above is preferably a side airbag device provided on a side part of the vehicle seat, and the cushion expands and deploys toward the side of the occupant of the vehicle seat. The airbag cover can thus be applied to the cushion of the side airbag device.

The second base material of the airbag cover described above is provided so as to contact a seat frame built into the vehicle seat along the side part of the vehicle seat, and is formed so as to function as a counterforce surface that receives counterforce from the seat frame during expansion and deployment of the cushion. Thus, in a state in which the airbag module is enclosed in the airbag cover, the second base material can maintain the shape of the airbag module to avoid edges of the seat frame and protect the airbag module.

The airbag device described above can be a curtain airbag device in which a cushion expands and deploys along a vehicle body sidewall in a vehicle cabin. The airbag cover can thus be applied to the cushion of the curtain airbag device.

The second base material of the airbag cover described above is preferably provided in contact with the vehicle body sidewall and is formed so as to function as a counterforce surface on which counterforce from the vehicle body sidewall is applied during expansion and deployment of the cushion. Thus, in a state in which the airbag module is enclosed in the airbag cover, the second base material can protect the airbag module from the side wall of the vehicle body such as the roof side rail.

In order to solve the problems described above, a representative configuration of a manufacturing method of the airbag cover according to the present invention is a manufacturing method for an airbag cover that encloses a bag-like cushion that is wound or folded and stowed within a vehicle cabin and expands and deploys using gas supplied from a built-in inflater, wherein the airbag cover includes a first base material made from a plain woven fabric or non-woven fabric made of synthetic fibers, and a second base material having a higher initial tensile resistance value than that of the first base material, which are partially overlapped, and the portions of the first base material and the second base material that overlap are integrally bonded by thermal bonding. Here, the initial tensile resistance value is a value indicated by the tensile strength when a prescribed fabric shape is elongated 5% using a prescribed tensile tester to pull the fabric under prescribed conditions.

With the configuration described above, an airbag cover in which the first base material and the second base material with different initial tensile resistance values that are integrally bonded by thermal fusing can be manufactured. As described above, the first base material and the second base material can be stowed in a shape in which the cushion is in a shape that fits a prescribed location within the vehicle cabin by enclosing the wound or folded cushion.

As the first base material has a lower initial tensile resistance value than that of the second base material, the cushion can be kept in an intended stowed state. Furthermore, providing a slit or the like in the first base material enables a way of reliably breaking the cushion without inhibiting expansion and deployment of the cushion, such that the expansion behavior of the cushion can be stabilized. Note that the configuration is not limited to the configuration in which slits are provided in the first base material, and bonding portions with weak adhesive force formed by adjusting the adhesive force may be provided instead of slits. In this manner, during the expansion and deployment of the cushion, the airbag cover can reliably cleave through starting at the junction with weak adhesive force, and thus deployment behavior can be stabilized without inhibiting the expansion and deployment of the cushion. On the other hand, because the second base material has an initial tensile resistance value higher than that of the first base material, arranging the second base material on the side closer to an obstruction protects the cushion from the obstruction not only when the cushion is stowed, but also during expansion and deployment, and failures such as bursts and the like can be prevented.

The thermal fusing described above is preferably performed at a temperature higher than the melting temperature of either the first base material or the second base material.

In this manner, the first base material or the second base material melts, and by applying pressure in this state, polymers can penetrate into the molten base material and bond the first base material and second base material together.

A pressing process may be added to the above thermal fusing. Performing a pressing process with the first base material and the second base material overlapped allows polymers to penetrate the inner portion of the base material, fusing the first base material and the second base material together. This pressing process is preferably performed at the same time as heating (thermal fusing), but can be performed after heating rather than at the same time as long as there is still residual heat in the heated product.

The second base material preferably includes fibers having a melting point that differs by 30° C. or more from the melting point of the fibers included in the first base material. The second base material can be formed by including such fibers.

Effect of the Invention

According to the present invention, an airbag cover, a method for manufacturing the same, and an airbag device can be provided in which a wound or folded cushion can be stowed in a shape that fits in a prescribed location with a vehicle cabin, and which can protect the cushion from an obstacle.

BRIEF DESCRIPTION OF THE DRAWINGS

FIG. 4 is a diagram illustrating the results of thermal fusing various conditions in the manufacturing method of the airbag cover.

FIG. 8 is a diagram illustrating a side airbag device according to another embodiment of the present invention.

EMBODIMENT OF THE INVENTION

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols in order to omit redundant descriptions along with the illustration of elements not directly related to the present invention.

Note that regarding this embodiment, when a passenger is seated in a seat in a regular posture, the direction the passenger faces is referred to as the front, and the opposite direction is referred to as the rear. Moreover, when the passenger is seated in the seat in a regular posture, the right of the passenger is referred to as the right direction, and the left of the passenger is referred to as the left direction. Furthermore, when the passenger is seated in a regular posture, the direction towards the head of the passenger is referred to as up, and the direction towards the legs of the passenger is referred to as down. In addition, as needed, any diagrams used in descriptions below will indicate the front, rear, left, right, up, and down directions based on the passenger as described above as Fr, Rr, L, R, Up, and Down.

Figure 1A:
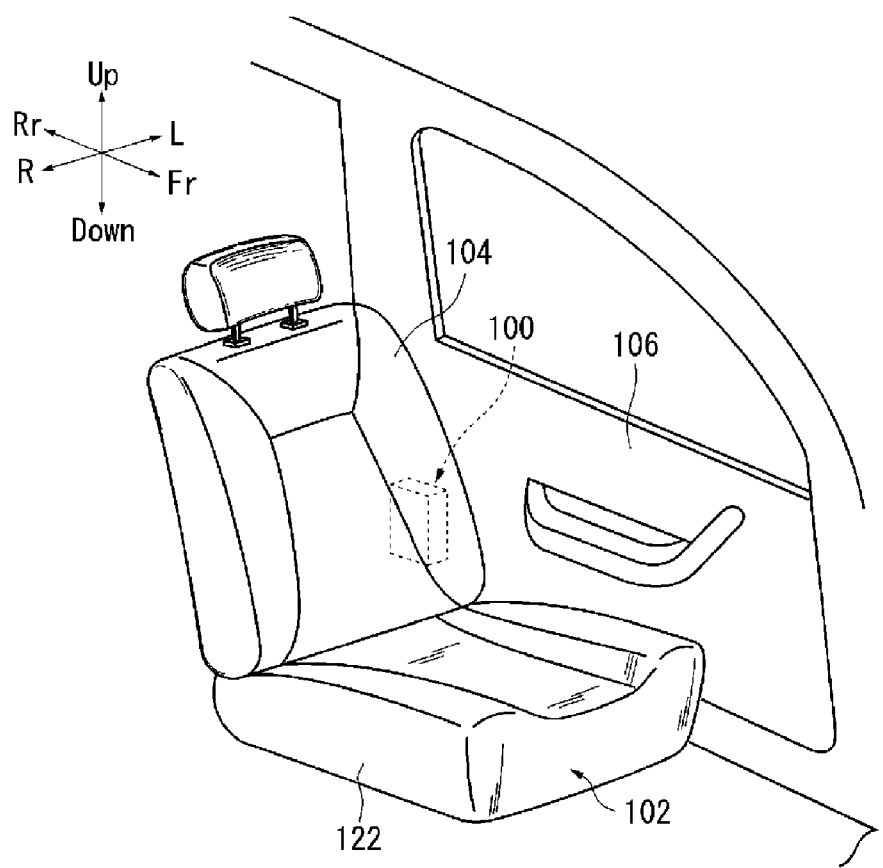
FIG. 1 is a diagram illustrating a side airbag device to which an airbag cover of the embodiment of the present invention is applied and a portion of a vehicle.

FIG. 1 is a diagram illustrating a side airbag device to which an airbag cover of the embodiment of the present invention is applied, and a portion of a vehicle. For example, as illustrated in FIG. 1 (a), a side airbag device 100 is built into a seatback 104 of a vehicle seat 102 on the left side of the vehicle, which is the passenger seat of the vehicle.

Figure 1B:
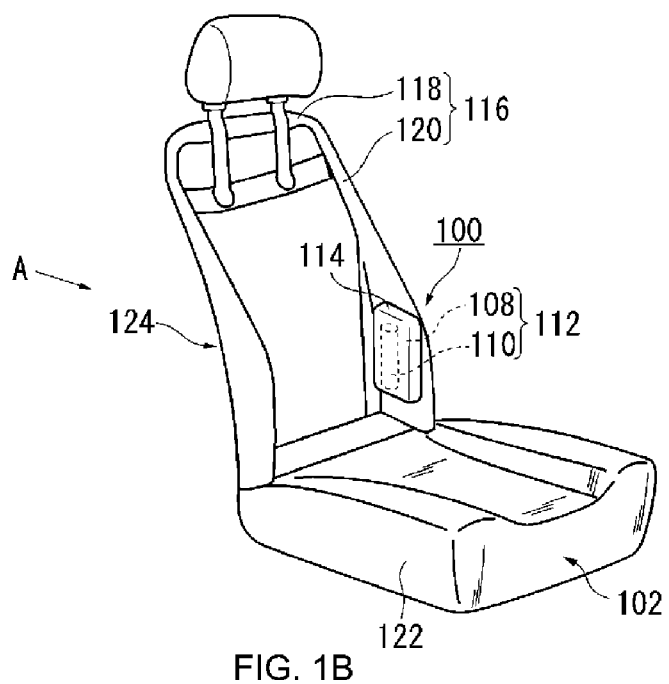
Figure 2A:
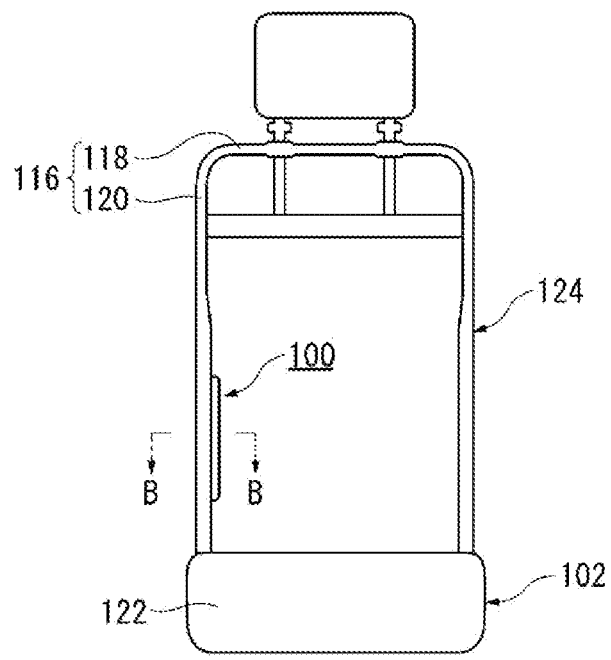
FIG. 2 is a diagram illustrating the side airbag device including a cushion in the stowed state of FIG. 1(b).
Figure 2B:
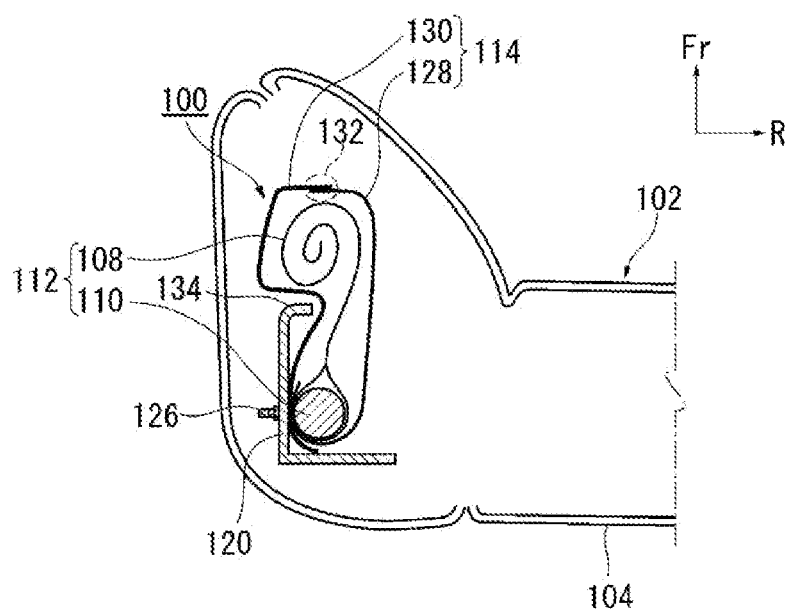
Figure 3A:
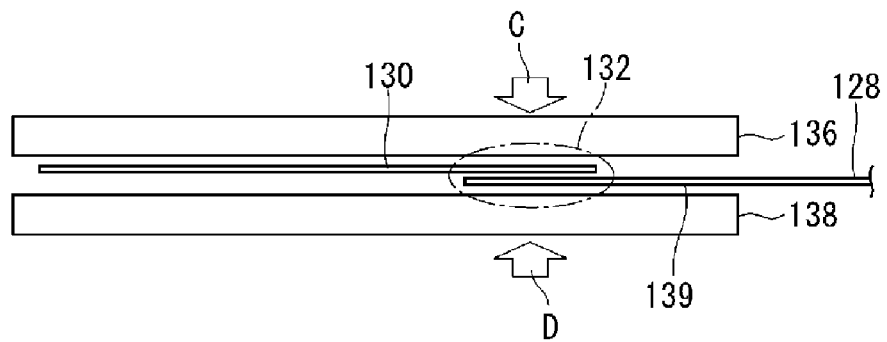
FIG. 3 is a diagram illustrating a manufacturing method of the airbag cover according to an embodiment of the present application.
Figure 3B:
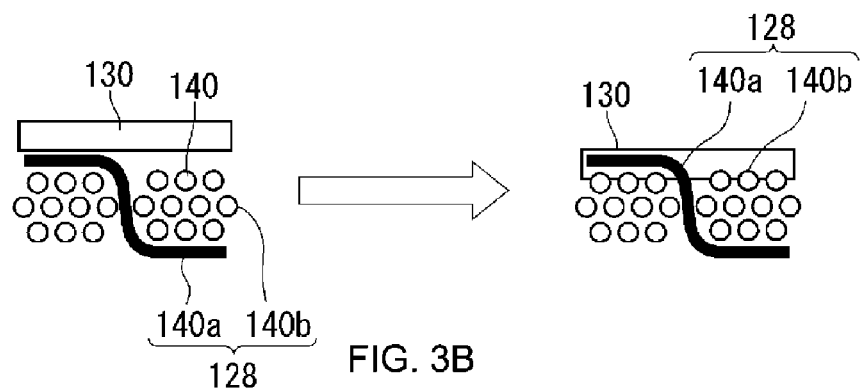
Figure 3C:
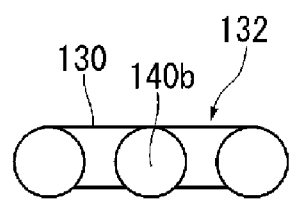
Figure 3D:
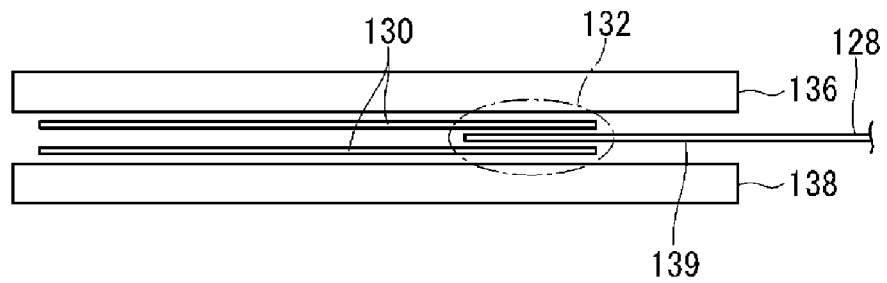

The side airbag device 100 is provided on the seatback 104 close to the outside of the vehicle, and includes a cushion 108 (see FIG. 2 (b)) that expands and deploys between the vehicle seat 102 and a side door 106. As illustrated in FIG. 1(b), the side airbag device 100 is provided with an inflater 110 that supplies gas for expansion and deployment of the cushion 108.

The cushion 108 is formed into a bag shape using, for example, a cut and sew method. Additionally, the cushion 108 is wound or folded and expands and deploys in an emergency using gas supplied from an inflater 110, which is a gas generator that is built in.

Furthermore, the side airbag device 100 includes an airbag cover 114 that encloses an airbag module 112, which will be described in greater detail below. Note that the airbag module 112 includes the cushion 108 and the inflater 110.

FIG. 1 (b) illustrates only a seatback frame 116 of the seatback 104 of the vehicle seat 102 of FIG. 1 (a), omitting the upholstery and seat pad (for example, the urethane material). The seatback frame 116 is a member that becomes the skeletal structure of the seatback 104, and includes an upper frame 118 and a side frame 120. The upper frame 118 is included in the seatback 104 along the upper edge of the seatback 104. Additionally, the side frame 120 is included in the seatback 104 along the side surface of the seatback 104. Note that in addition to the seatback frame 116, a seating frame (not illustrated) built into a seat cushion 122 is included and referred to as seat frame 124.

As illustrated in FIG. 1(b), the side airbag device 100 is disposed on the occupant side of the side frame 120 of the seatback frame 116, with the airbag module 112 including the cushion 108 and the inflater 110 enclosed in the airbag cover 114.

FIG. 2 is a diagram illustrating the side airbag device 100 including a cushion 108 in the stowed state of FIG. 1 (b). FIG. 2 (a) is a sectional view indicated by the arrow A in FIG. 1 (b). FIG. 2 (b) is a cross-sectional view taken along the line B-B in FIG. 2 (a).

As illustrated in FIG. 2 (a), the side airbag device 100 is disposed on the occupant side of the side frame 120. More specifically, in the airbag module 112, as shown in FIG. 2 (b), the wound or folded cushion 108 and the built-in inflater 110 are enclosed in the airbag cover 114 and in a stowed state. In this state, the airbag module 112 is installed in the side frame 120 via the inflater 110, and is housed on the occupant side of the side frame 120. Note that the inflater 110 is a cylinder type (cylindrical), and is attached to the occupant side of the side frame 120 using a stud bolt 126 protruding from the main body.

The airbag cover 114 includes a first base material 128 and a second base material 130 having different initial tensile resistance values (described below), and the first base material 128 and the second base material 130 are integrally bonded via a bonding part 132 formed by thermal fusing.

Here, the initial tensile resistance value is a value expressed by the tensile strength when the pulled fabric is elongated 5% when a prescribed tensile tester is used to pull a fabric having a prescribed shape under prescribed conditions. An example of a method for measuring initial tensile resistance will be described below. A SHIMADZU (tensile testing machine) AUTOGRAPH AG-50kNG was used as a measuring device for tensile strength. A SHIMADZU (Kyowa Load Cell) Type SFL-50KNAG (P/N 340-43122-01) 50KN was used as the load cell. A SHIMADZU (extensometer) SES-1000 was used to measure the tensile length.

The shape of the fabric test piece (sample piece) to be prepared had dimensions of 50 min×300 mm N66 plain woven fabric and PET non-woven fabric were prepared as the base materials. The N66 plain woven fabric was cut into 60 mm×300 mm, and then the warp threads were removed to make the dimensions exactly 50 mm×300 mm. The PET non-woven fabric was cut to 50 mm×300 mm. The N66 plain woven fabric was tested by pulling in the warp direction, and the PET non-woven fabric was tested by pulling in the MD (machine direction). The number of samples was n=5 for each.

The specific test conditions are described below. Under normal temperature (20° C.±15° C.), normal humidity (relative humidity 45-85%) and normal pressure (pressure at which no special pressure reduction or pressurization is performed; normally a pressure equivalent to atmospheric pressure, approximately one atmosphere), the sample piece was first held using an air chuck with an initial chuck distance (initial length) of 100 mm and an initial load of 1.5 N. Next, the gripping part of the extensometer was held and placed near the center of the sample piece so that the distance therebetween was 50 mm. The sample piece was then pulled at a tensile speed of 100 mm/min, and the value of the tensile strength at 5% elongation relative to the initial length was used as the initial tensile resistance value.

The first base material 128 is a base material including a plain woven fabric or a non-woven fabric made of synthetic fibers, and is formed by weaving together warp and weft yarns of nylon fibers or polyester fibers as an example. The first base material 128 can be formed by interweaving such fibers. However, no such limitation is intended, and a non-woven fabric of nylon, polyester, or polypropylene may be used as the first base material 128.

The second base material 130 is a base fabric that includes different fibers than the first base material 128, has a higher initial tensile resistance than the first base material 128, and is formed of a ductile fabric material. The ductile fabric material may be a non-woven fabric including a plurality of polymer fibers, a felt-like material, or may be formed from polyester fibers. By forming the second base material 130 with such ductile fabric material, the initial tensile resistance value can be higher than that of the first base material 128.

Because the first base material 128 and the second base material 130 are capable of maintaining their own shape based on their properties, through enclosing the wound or folded cushion 108, the cushion 108 can be stowed in a shape that fits in a prescribed location in the vehicle cabin, such as the occupant side of the side frame 120.

Since the first base material 128 has a lower initial tensile resistance value than that of the second base material 130, the first base material 128 can easily deform following the shape of the prescribed location in which the cushion 108 is to be stowed. In other words, the first base material 128 is proficient in the function of keeping the cushion 108 in the desired stowed state. Also, providing a slit or the like in the soft first base material 128 enables a way of reliably breaking the cushion 108 without inhibiting expansion and deployment of the cushion 108, and as a result, the expansion behavior of the cushion 108 can be stabilized.

The second base material 130 does not only have a relatively higher initial tensile resistance value than that of the first base material 128 and does not easily deform, but can also maintain a shape. As such, the second base material 130 is provided so as to contact the side frame 120 from the occupant side as illustrated in FIG. 2(*b*). In other words, the second base material 130 is disposed on the side of the cushion 108 in the stowed state near obstacles such as the edge 134 of the side frame 120 and the like, enabling the cushion 108 to maintain a shape so as to avoid obstructions. Thus, according to the second base material 130, the cushion 108 can be protected from obstructions even when the cushion 108 is stowed, as well as during expansion and deployment of the cushion 108.

In particular, when the second base material 130 is formed of felt material rather than plastic, the felt is softer than plastic, and can be deformed to follow the shape of a prescribed location in which the cushion 108 is to be stowed, and weight reduction can be further achieved.

The material of the bonding part 132 illustrated in FIG. 2(*b*) will now be described. The bonding part 132 is formed from a ductile fabric material containing a plurality of polymer fibers, and at least a portion of the polymer fibers are formed fused together, and can take the shape of a non-woven fabric including a plurality of polymer fibers as an example. As a non-woven fabric, a felt-like material (polyester felt, for example) can be used. Polyester felts are manufactured by a known needle method, in which polyester fibers are entangled and fixed to each other based on needle processing. As another example, polyester fibers can be provided as polyethylene terephthalate (PET), wherein the felt materials may be made of 100% PET.

Fibers configuring felt materials are randomly or pseudo-randomly entangled. Moreover, the felt can include two kinds of fibers of different configurations. Moreover, all mono-component composite fibers configuring the felt can be formed of PET homo-polymers, wherein bi-component composite fiber having a core and coating surrounding the cores can be used. The core and the coating of the bi-component composite fiber are configured to have different properties, in particular different melting points, with the coating having a significantly lower melting point than the core (for example, the core has a melting point of about 260° C. and the coating having a melting point of about 110° C. to 150° C.). As an example, the second base material 130 is more preferably a fiber having a melting point with a difference of 30° C. or higher than the melting point of the fibers included in the first base material 128.

The bi-component composite fibers can also be formed entirely of polyester, but the core can be molded from PET homo-polymers and the coating can be formed from copolymers (coPET). When such a PET and coPET are combined, while the melting point of the coating is lower than the melting point of the cores, overall, the fibers can be assuredly formed of PET.

Both cores of the two component conjugate fibers and the single component fibers are formed of PET homopolymers and therefore have the same melting point, with the single component fibers having a melting point higher than the coating of the two component conjugate fibers. The two component conjugate fibers are equally distributed to the overall single component fibers in felt materials. The two component conjugate fibers can account for 30% to 60% of all fibers of felt materials, while all the remaining fibers can be the single component fibers. By including the bi-component composite fibers in the felt material of the second base material 130, heat treatment (thermal processing) of the felt material at a temperature higher than the melting point of the coating enables increasing the initial tensile resistance value of the second base material 130.

As shown in Table 1, the stability of shape during airbag deployment was verified for embodiments 1 and 2, and the comparative example, in which several types of first base materials and second base materials were combined.

TABLE 1

| | First base material | Second base material | First base material/initial tensile resistance value [N] | Second base material/initial tensile resistance value [N] | Results |
|---|---|---|---|---|---|
| Embodiment 1 | N66 Plain woven base material | PET + Co-PET non-woven fabric (thermal processing) | 125 | 425 | ○ |
| Embodiment 2 | PET Non-woven fabric | PET + Co-PET non-woven fabric (thermal processing) | 143 | 425 | ○ |
| Comparative Example | PET Non-woven fabric | PET + Co-PET Non-woven fabric | 143 | 50 | x |

In embodiment 1, a N66 plain woven fabric was prepared as a first base material, and a PET+Co-PET non-woven fabric that was subjected to thermal processing was prepared as a second base material, and these were combined. Here, the N66 plain woven fabric is a fabric obtained by weaving nylon 66 fibers. In addition, the PET+Co-PET non-woven fabric is a fabric formed by using normal PET in the core portion of the fibers and using a Co-PET (Copolymer-PET: modified PET copolymer) in the coating (sheath) portion by chemical bonds, thermal bonds, needle punches, spun laces, stitch-bonds, or the like. Furthermore, thermal processing of the second base material is a process of heating and pressurizing at 150° C. to 200° C. for 20 seconds to 3 minutes to compress and harden the non-woven fabric to obtain a compressed body.

In embodiment 1, the initial tensile resistance value of the first base material was "125", the initial tensile resistance value of the second base material was "425", an initial tensile resistance value higher than that of the first base material. As a result, in embodiment 1, the stability of the shape when the airbag was deployed was "0", or in other words, good shape retention of the airbag module during installation, and the deployment behavior during deployment was stable and favorable.

In embodiment 1, a PET non-woven fabric was prepared as a first base material, and a PET+Co-PET non-woven fabric that was subjected to thermal processing was prepared as a second base material, and these were combined. Here, the PET non-woven fabric is made of polyester (polyethylene terephthalate) fibers as a non-woven fabric using the spunbond method.

In embodiment 2, the initial tensile resistance value of the first base material was "143", the initial tensile resistance value of the second base material was "425", an initial tensile resistance value higher than that of the first base material. As a result, in embodiment 2, the stability of the shape when the airbag was deployed was "0", or in other words, good shape retention of the airbag module during installation, and the deployment behavior during deployment was stable and favorable.

In the comparative example, a PET non-woven fabric was prepared as the first base material, and a PET+Co-PET non-woven fabric was prepared as the second base material, and these were combined. Here, no thermal processing is applied to the second base material in the comparative example.

In the comparative example, the initial tensile resistance value of the first base material was "143", the initial tensile resistance value of the second base material that was not subjected to thermal processing was "50", which is an initial tensile resistance value lower than that of the first base material. As a result, in the comparative example, the stability of the shape when the airbag was deployed was "X", or in other words, poor shape retention of the airbag module during installation, and the deployment behavior during deployment was not stable.

Next, a method of molding the bonding part 132 and the compression body (second base material) 130 will be described with reference to FIG. 3. FIG. 3 is a diagram illustrating the manufacturing method of the airbag cover 114 according to the embodiment of the present application.

First, as illustrated in FIG. 3 (a), the first base material 128 made up of nylon N66 and a second base material 130 made up of a felt material prior to compression are partially overlapped, and pressure (for example, 5 kg/cm² to 50 kg/cm²) is applied from pressing devices 136 and 138 from the vertical direction indicated by arrows C and D, and in addition, heat is applied. The heating temperature may be a temperature higher than the melting point of the second base material 130 (110° C. for example), such as 150° C. or 180° C. (however, this heating temperature will vary depending on the melting point of the second base material and may in some cases be in the range of 100 to 200° C.; in the present application, the heating temperature is preferably in the range of 100 to 180° C., and more preferably in a range of 140 to 180° C.). That is to say, that the pressing devices 136 and 138 operate at temperatures above the melting point of the bi-component composite fiber coating of the felt material, but below the melting point of the bi-component composite fiber core and the mono-component fibers. Note that the heat and pressure are not required to be applied simultaneously. The heating temperature, the pressurizing force, and the processing time are each related, and the processing conditions are not determined by only one parameter. The concept of the basic processing conditions is that increasing the heating temperature results in a lower processing time. Taken as a whole, if any one of these conditions is large (high or long), the other parameters may become relatively small (lower or shorter).

When felt material is heated and compressed, the fibers are compressed into each other and the felt material becomes thinner (0.55 mm for example), deforming plastically into a compressed body. More specifically, when heated at temperatures higher than the melting point of the coating of the two component conjugate fibers, the coating is dissolved. Therefore, the coating is fused together at all positions in which fibers of the joining material are distributed. Here, because the joining material is heated at a temperature lower than the melting point of the cores of the bi-component composite fibers along with the overall structure of the single component fibers, the cores and the single component fibers are still in solid phase, and not fused together, with only the materials of the coating fused together. FIG. 3 (*a*) also illustrates bridge parts 139 described below (see FIG. 5 (*a*)) of the first base material 128.

When heat and pressure are applied by the pressing devices 136, 138 and a prescribed heating time (for example 20 seconds or 100 seconds) elapses, as illustrated in FIG. 3 (*b*), the fluid polymer of the second base material 130 moves toward the gap between warp 140*a* and weft 140*b* of the first base material 128 and further penetrates into the inner portion of the first base material 128. In this manner, the bonding part 132 (see FIG. 3 (*c*)) that integrally bonds the first base material 128 and the second base material 130 is formed by thermal fusing with pressure, and the entire second base material 130 is compressed and solidified into a compressed body. Although a plain weave structure is used in this diagram, the same mechanism can be used with a non-woven fabric to allow the polymer of the second base material 130 to penetrate into the inner portion of the first base material 128 to form the bonding part 132. Note that in FIG. 3 (*c*), a state is illustrated in which the weft 140*b* of the first base material 128 and the second base material 130 are bonded, but as illustrated on the right side of FIG. 3(*b*), the warp 140*a* of the first base material 128 is also bonded to the second base material 130. In this manner, the bonding part 132 is formed.

Here, in the example of FIG. 3 (*a*), when forming the bonding part 132, a structure is used in which the second base material 130, which is a felt material, is set on one side with respect to the first base material 128, but the present invention is not limited thereto. As in the example illustrated in FIG. 3 (*d*), a structure may be used in which the second base material 130, which is a felt material, is set so as to sandwich the first base material 128 from above and below for the case a bonding part 132 is formed. Whichever structure is used, the second base material 130 as a compressed body can be formed at the same time as the bonding part 132 is formed.

In the present invention, if there are locations that should not be bonded, for example, or when the airbag cover 114 is fused while enclosing the cushion 108, those areas not to be fused may be silicon-coated or covered with a silicon-coated fabric. FIG. 4 is a diagram illustrating the results of thermal fusing under various conditions in the manufacturing method of the airbag cover 114. The adhesive surface shown in the drawing is the portion of the first base material 128 that overlaps the second base material 130, and is designated as a "25 g coating" when silicon coating is applied and as "no coating" when silicon coating is not applied.

The thermal fusing results in FIG. 4 show that when a silicon coating is applied to the adhesive surface of the first base material 128 (No. 3, 4, 7, and 8), they are "NG" regardless of the heating temperature and heating time, or in other words the first base material 128 and the second base material 130 cannot be bonded.

In addition, the results show that when a silicon coating is not applied to the adhesive surface of the first base material 128 (No. 1, 2, 5, and 6), the adhesive strength, or in other words the force required for separation, becomes stronger the higher the heating temperature and the longer the heating time. However, looking at the results from No. 5 and No. 6, an assumption can be made that the adhesive strength is saturated to some extent, as the adhesive strength does not become much stronger with longer heating times.

Note that by adjusting the adhesive strength of the first base material 128 and the second base material 130, bonding parts with weak adhesive strength may be intentionally provided. In this manner, during the expansion and deployment of the cushion 108, the airbag cover 114 can reliably cleave through starting at the junction with weak adhesive force, and thus the deployment behavior can be stabilized without inhibiting the expansion and deployment of the cushion 108.

By forming the bonding part 132 based on the results of such pressurized thermal fusing, an airbag cover 114 (see FIG. 5) can be manufactured in which the first base material 128 and the second base material 130 having different initial tensile resistance values are integrally bonded together.

Figure 5A:
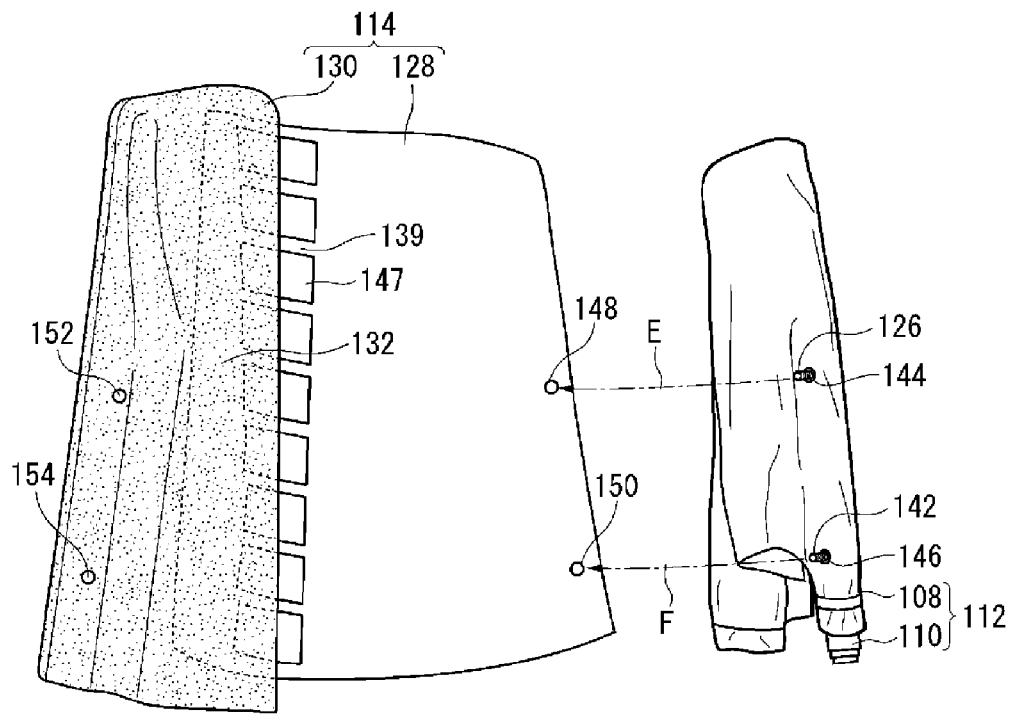
FIG. 5 is a diagram illustrating the process of winding the airbag cover around an airbag module.
Figure 5B:
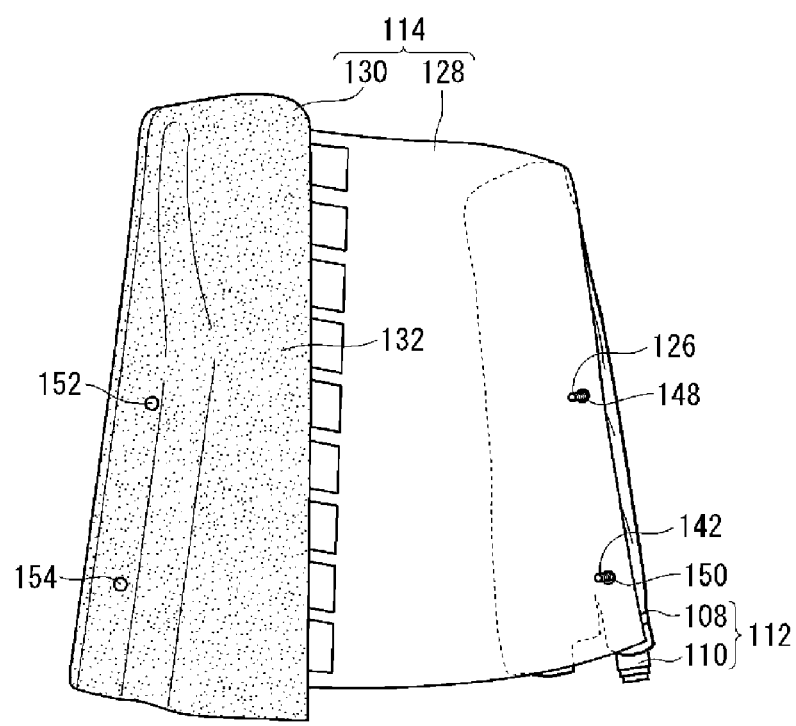

A procedure for wrapping the airbag cover 114 around the airbag module 112 to enclose the airbag cover will be described below with reference to FIG. 5 to FIG. 7. FIG. 5 is a diagram illustrating the process of winding the airbag cover 114 around the airbag module 112.

With the airbag module 112 illustrated in FIG. 5 (*a*), the stud bolts 126, 142 protruding from the main body of the inflater 110 are respectively inserted into two insertion holes 144, 146 formed in the cushion 108, with the inflater 110 inserted into the cushion 108, and pass from the inside to the outside of the cushion 108.

The airbag cover 114 is configured by a first base material 128 and a second base material 130 that is a compressed body. A plurality of slits (or slots) 147 are formed in the first base material 128 starting at the bonding part 132 of the first base material 128 and the second base material 130. Bridge parts 139 are formed over the slits 147. A portion of the slits 147 and the bridge parts 139 are formed in the region of the second base material 130 as a compressed body. Additionally, the remaining portions of the slits 147 and the bridge parts 139 are formed in the region of only the first base material 128.

In addition, the cushion 108 is wound or folded. As illustrated in FIG. 5 (*a*), in the airbag cover 114, the insertion holes 148, 150 of the stud bolts 126, 142 are formed in the first base material 128, and the insertion holes 152, 154 of the stud bolts 126, 142 are formed in the second base material 130, which is a compressed body.

First, as illustrated in FIG. 5 (*a*), the airbag module 112 is disposed near the side of the airbag cover 114. Next, the stud bolts 126, 142 of the inflater 110 pass through the insertion holes 148, 150 of the first base material 128 from the back side of the first base material 128 (arrows E, F), and the airbag module 112 is overlaid on the first base material 128 (see FIG. 5 (b)).

Figure 6A:
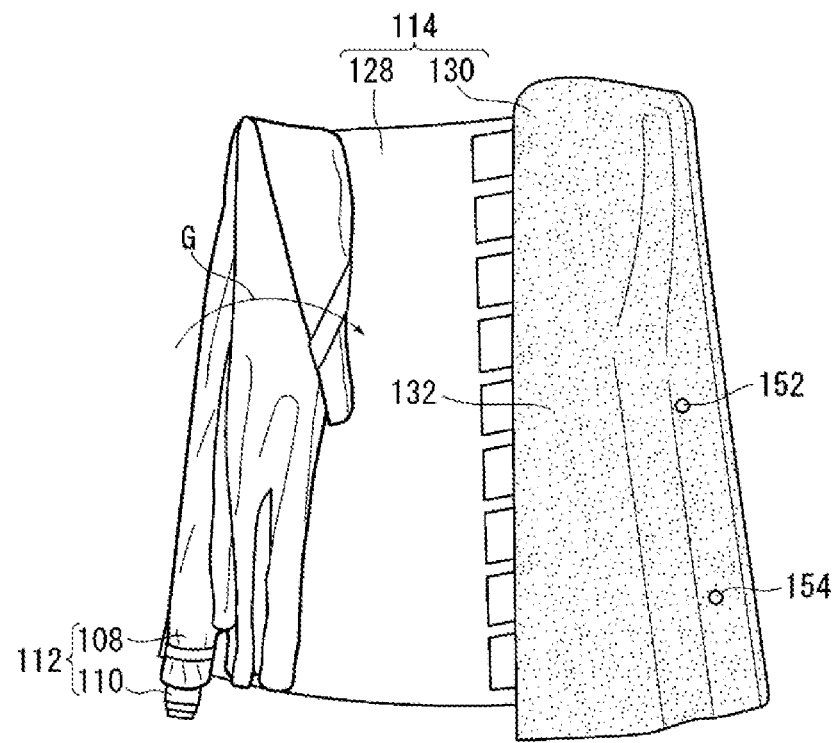
FIG. 6 is a diagram illustrating the process subsequent that in FIG. 5.
Figure 6B:
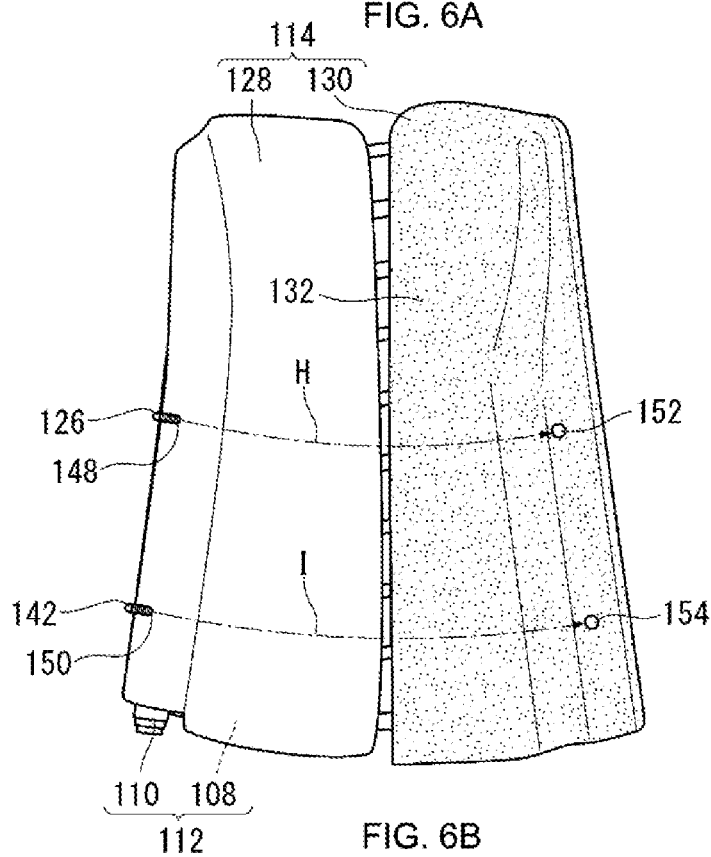

FIG. 6 is a diagram illustrating the process in continuation of FIG. 5. FIG. 6 (a) illustrates a state in which the airbag cover 114 and the airbag module 112 illustrated in FIG. 5 (b) are viewed from the rear side. When the airbag module 112 is wound around the airbag module 112 together with the first base material 128 toward the second base fabric 130 from this state (arrow G), the airbag module 112 wrapped in the first base material 128 approaches the second base material 130 as shown in FIG. 6 (b).

Furthermore, from this state, as illustrated by arrows H, I of FIG. 6 (b), the airbag module 112 wrapped in the first base material 128 is wrapped toward the second base fabric 130 so that the stud bolts 126, 142, which pass through the insertion holes 148, 150, respectively, of the first base material 128, are passed through the insertion holes 152 and 154, respectively, of the second base material 130. In this manner, the side airbag device 100 can be manufactured in which the airbag module 112 is wrapped in the airbag cover 114 (see FIG. 7).

Figure 7A:
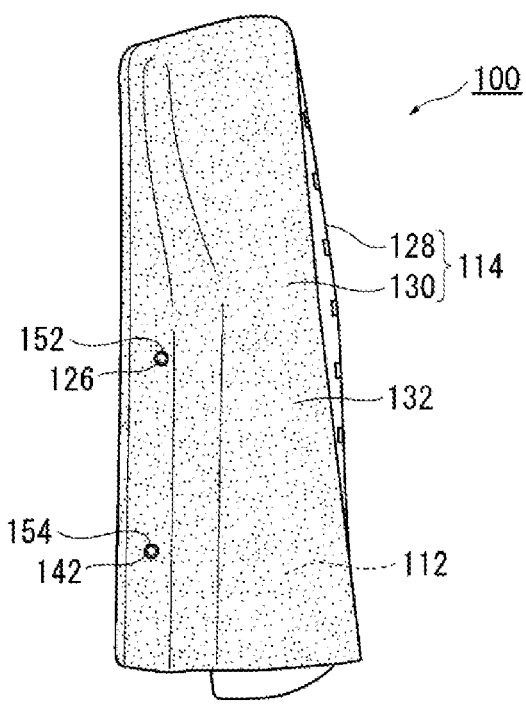
FIG. 7 is a diagram illustrating the side airbag device manufactured following the processes of FIG. 5 and FIG. 6.
Figure 7B:
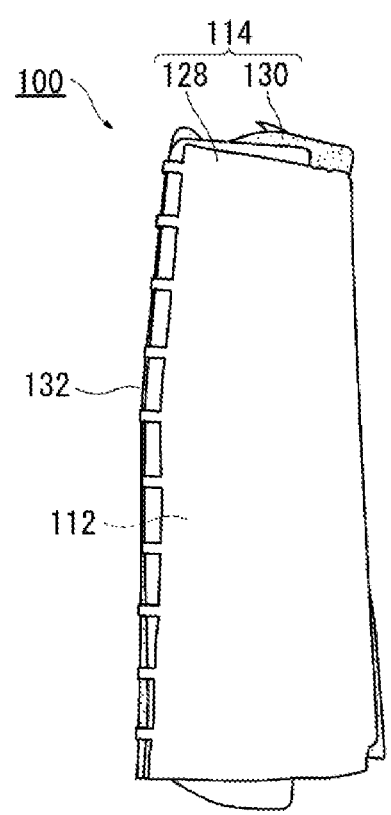
Figure 7C:
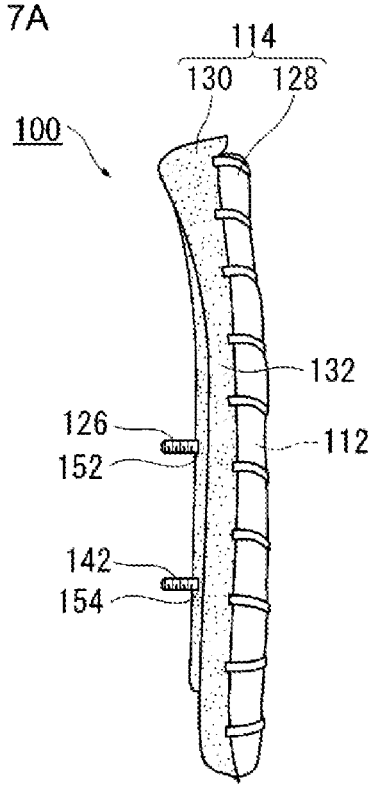

FIG. 7 is a diagram illustrating the side airbag device 100 manufactured following the processes of FIG. 5 (a) and FIG. 6. Regarding the side airbag device 100, the stud bolts 126, 142 pass through the insertion holes 152, 154 of the second base material 130, respectively, as shown in FIGS. 7 (a) and 7 (c), and the airbag module 112 is wrapped up in the airbag cover 114 as illustrated in FIG. 7 (c).

By providing the airbag cover 114 separately from the airbag module 112, the airbag cover 114 can be manufactured and then wound around to enclose the airbag module 112. Thus, the airbag cover 114 can be made in a separate location from the airbag module 112.

FIG. 8 is a diagram illustrating a side airbag device 100A according to another embodiment of the present invention. FIG. 8 is a view corresponding to the side airbag device 100 illustrated in FIG. 2(b). The side airbag device 100A differs from the side airbag device 100 in terms of being disposed on an opposite side of the side frame 120 from the occupant.

More specifically, regarding the side airbag device 100A, the airbag module 112 wrapped up in the airbag cover 114 is disposed on the side frame 120 via the inflater 110, and is stowed on a side opposite to the occupant side of the side frame 120.

The second base material 130, which has a relatively high initial tensile resistance value and is resistant to deformation, is provided so as to contact the side frame 120 from the side opposite the occupant side; the cushion 108 is formed so as to function as a counterforce surface that receives the counterforce from the side frame 120 during expansion and deployment of the cushion 108 and is disposed on the side of the cushion 108 in a stowed state closer to an obstacle such as the edge 134 of the side frame 120. As a result, the second base material 130 can maintain a shape such that the cushion 108 avoids obstructions, and also protects the cushion 108 from obstructions even when the cushion 108 is stowed, as well as when the cushion 108 is expanded and deployed, preventing failures such as bursts and the like.

The side airbag devices 100, 100A configured in this manner easily break the slits 147 (FIG. 5 (a)) of the first base material 128 when the cushion 108 of the airbag module 112 expands and deploys and therefore do not inhibit expansion and deployment of the cushion 108.

Figure 9A:
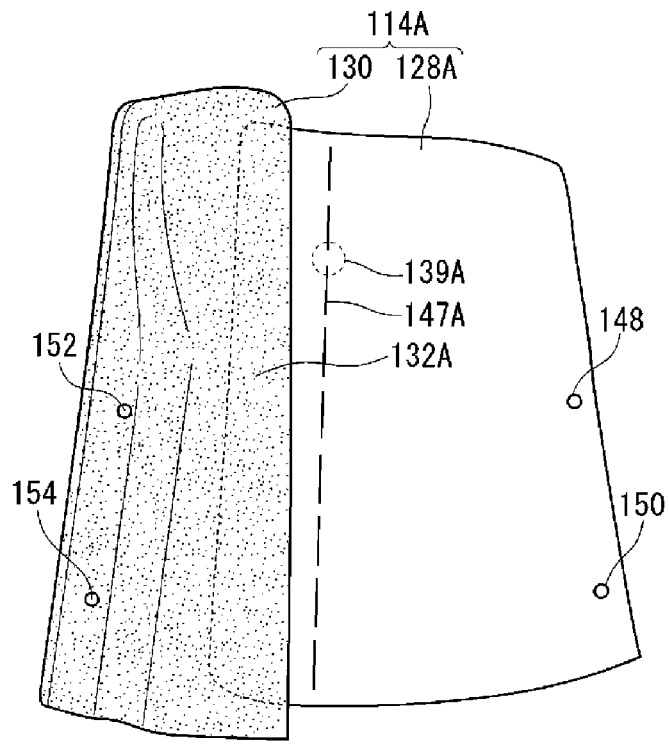
FIG. 9 is a diagram illustrating a variation of the airbag cover in FIG. 5(a).
Figure 9B:
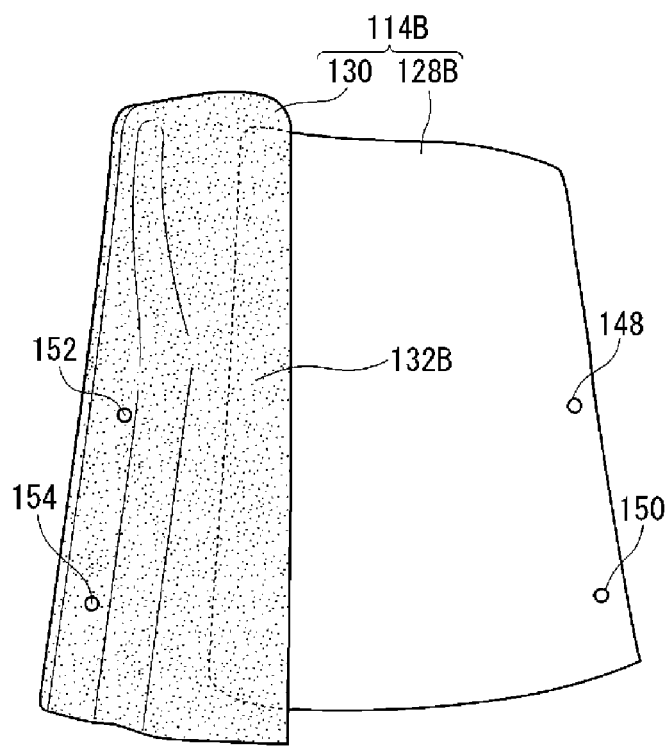

FIG. 9 is a diagram illustrating a variation of the airbag cover 114 in FIG. 5 (a). Regarding an airbag cover 114A illustrated in FIG. 9 (a), a configuration is employed in which slits 147A of the first base material 128A do not overlap with a bonding part 132A. The bonding part 132A of the airbag cover 114A contacts and bonds the entire surface of the overlapping portion of the first base material 128A and the second base material 130. The slits 147A and bridge parts 139A of the first base material 128A are alternately provided along the edges of the second base material 130, which is a compressed body, in the region of the first base material 128A. The side airbag devices 100, 100A employing such an airbag cover 114A easily break the slits 147A of the first base material 128a during expansion and deployment of the cushion 108, and thus do not inhibit expansion and deployment of the cushion 108.

Regarding an airbag cover 114B illustrated in FIG. 9 (b), a bonding part 132B is formed using a first base material 128B that does not form a slit and a bridge part. When forming the bonding part 132B of the airbag cover 114B, a structure (see FIG. 3 (a)) is employed in which the second base material 130, which is a felt material, is set on one side relative to the first base material 128b (see FIG. 3(a)). In this manner, the side airbag devices 100, 100A that use the airbag cover 114b do not inhibit the cushion 108 from expanding and deploying by peeling and separating the first base material 128 from the second base material 130, which is a compressed body, at the bonding part 132B, and do not inhibit expansion and deployment of the cushion 108.

Figure 10A:
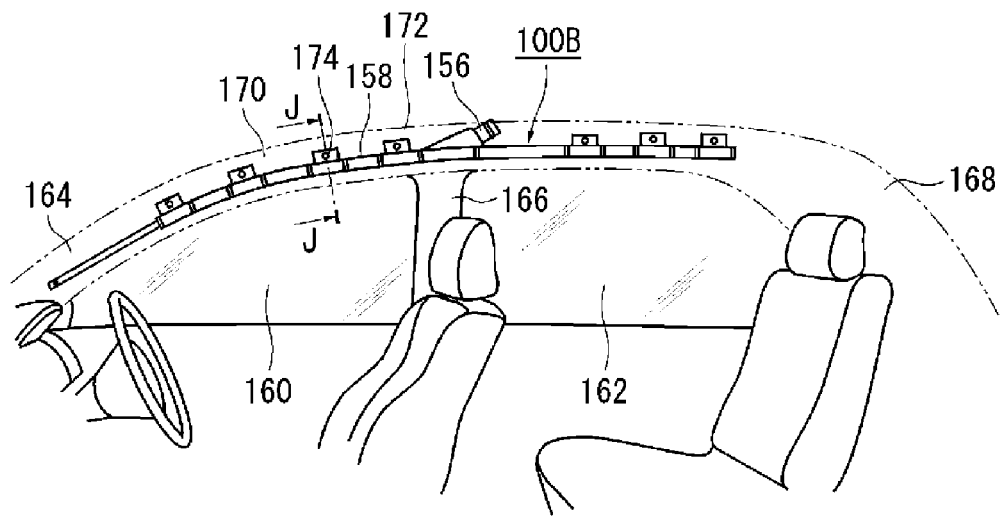
FIG. 10 is a diagram illustrating a curtain airbag device to which the airbag cover of the embodiment of the present invention is applied.

FIG. 10 is a diagram that illustrates a curtain airbag device 100B to which the airbag cover 114 of the embodiment of the present invention is applied. FIG. 10 (a) illustrates the non-deployed state (stowed) of the curtain airbag device 100B. FIG. 10 (b) illustrates the J-J cross-section of FIG. 10 (a).

The curtain airbag device 100B restrains the occupant by expanding and deploying a cushion 158 based on pressure of the gas supplied from an inflater 156 during an emergency, such as a side collision. As illustrated in FIG. 10 (a), side windows 160, 162 are provided on a side surface portion of the vehicle starting at the front of the vehicle. Pillars supporting the roof are provided in the vehicle front-rear direction for each of the side windows 160, 162. Starting at the front of the vehicle, these pillars are referred to as a front pillar 164, a center pillar 166, and a rear pillar 168.

The vehicle further includes a roof side rail 170 and a cover 172 that covers the roof side rail 170 on the side of the vehicle interior. Note that in the diagrams, the cover 172 is illustrated by a two-dot dashed line. The roof side rail 170 is positioned on the upper side of the interior of the vehicle and forms the vehicle body side wall.

The cushion 158 is wound or folded over the entire vehicle front-rear direction and is stowed between the roof side rail 170 and the cover 172 in the J-J cross-section illustrated in FIG. 10 (b). The cushion 158 stowed in these limited storage spaces is attached to the top side of the vehicle cabin by a plurality of tabs 174.

Figure 10B:
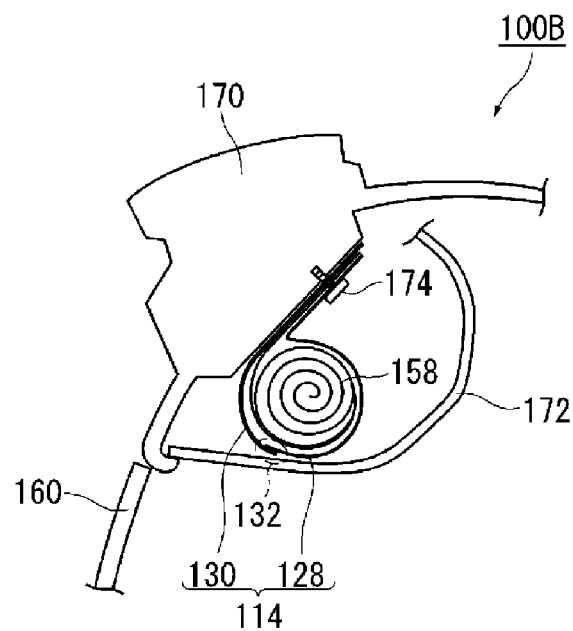

Regarding the curtain airbag device 100B, as illustrated in FIG. 10(b), the cushion 158 is wrapped up by the airbag cover 114 and in a stowed state, and furthermore, the second base material 130 is provided in a manner so as to contact the roof side rail 170, which is a vehicle body side wall, and is formed to function as a counterforce surface to receive counterforces from the roof side rail 170 during expansion and deployment of the cushion 158.

Therefore, according to the curtain airbag device 100B, by disposing the second base material 130, which has a relatively high initial tensile resistance value and is resistant to deformation, on the side of the cushion 158 in a stowed state close to the obstacle (here, the roof side rail 170), the cushion 158 is protected from the obstruction and prevents defects such as bursts and the like. Furthermore, because the first base material 128 has a lower initial tensile resistance value than that of the second base material 130, the cushion 158 can be easily deformed following the shape of the prescribed location in which the cushion 158 is to be stowed, and the cushion 158 can be stowed in a shape that fits in the prescribed location.

Thus, the airbag cover 114 can be applied to any of the side airbag devices 100, 100A and the curtain airbag device 100B, and furthermore, the wound or folded cushions 108, 158 can be stowed in a location fit in a prescribed location in the vehicle cabin while protecting the cushions 108, 158 from obstructions.

Preferred embodiments of the present invention were described with reference to the appended drawings, however, it goes without saying that the present invention is not limited to such examples. It is clear that a person of ordinary skill in the art could conceive of various modifications or revisions within the scope set forth by the claims, and it would be understood that these modifications or revisions would belong to the technical scope of the present invention.

Moreover, although the embodiment above describes an example in which a side airbag device or curtain airbag device equipped with an airbag cover according to the present invention is applied to an automobile, the airbag cover can also be applied to aircraft, ships, or the like in addition to automobiles, while obtaining the same effects.

INDUSTRIAL APPLICABILITY

The present invention can be used in an airbag cover that encloses a cushion that is stowed in a vehicle cabin and expands and deploys for the purpose of protecting an occupant in an emergency, a method for manufacturing the same, and can be used for an airbag device provided with an airbag cover.

EXPLANATION OF CODES

100, 100A: side airbag device; 100B: curtain airbag device; 102: vehicle seat; 104: seatback; 106: side door; 108, 158: cushion; 110, 156: inflater; 112: airbag module; 114, 114A, 114B: airbag cover; 116: seat back frame; 118: upper frame; 120: side frame; 122: seat cushion; 124: seat frame; 126, 142: stud bolts; 128, 128A, 128B: first base material; 130: second base material; 132, 132A, 132B: bonding part; 134: side frame edge; 136, 138: pressing devices, 139, 139A: first base material bridge part, 140A: first base material warp, 140b: first base material weft; 144, 146: cushion insertion hole; 147, 147A: first base material slit (slot); 148, 150: first base material insertion hole; 152, 154: second base material insertion hole; 160, 162: side window; 164: front pillar; 166: center pillar; 168: rear pillar; 170: roof side rail; 172: cover; 174: tab

The invention claimed is:

1. An airbag cover that encloses a bag-shaped cushion that is wound or folded and stowed in a vehicle cabin that expands and deploys using gas supplied from a built-in inflater, comprising a first base material made up of a plain woven fabric or non-woven fabric of synthetic fibers and a second base material that is integrally bonded with the first base material, contains different fibers than the first base material, and has a higher initial tensile resistance value than the first base material, wherein the initial tensile resistance value is the value shown for tensile strength when a cloth with a prescribed shape is pulled under prescribed conditions with a prescribed tensile testing machine and the cloth is elongated by 5%.

2. The airbag cover according to claim 1, wherein the first base material and the second base material are bonded by the fiber polymers of one of the base materials penetrating between fibers of the other base material.

3. The airbag cover according to claim 1, wherein the first base material is formed by interweaving warp and weft yarns of at least nylon or polyester fibers.

4. The airbag cover according to claim 1, wherein the first base material is formed of a non-woven fabric containing at least one of rayon, nylon, polyester, polypropylene, acrylic, vinylon, aramid synthetic fibers, or glass fibers.

5. The airbag cover according to claim 1, wherein the second base material comprises a compressed body formed of a compressed ductile fabric material.

6. The airbag cover according to claim 5, wherein the ductile fabric material is a polymer non-woven fabric material mixed with single fibers or a non-woven fabric material containing a plurality of polymer fibers.

7. The airbag cover according to claim 5, wherein the ductile fabric material is a felt-like material.

8. The airbag cover according claim 5, wherein the ductile fabric material is formed of polyester fibers.

9. The airbag cover according to claim 1, wherein the second base material includes fibers having a melting point that differs by 30° C. or more from the melting point of the fibers included in the first base material.

10. The airbag cover according to claim 1, wherein the airbag cover is provided separately from the airbag module comprising an inflator and a cushion that incorporates the inflater.

11. An airbag device provided with an airbag cover that encloses a bag-shaped cushion that is wound or folded and stowed in a vehicle cabin that expands and deploys using gas supplied from a built-in inflator, comprising a first base material made up of a plain woven fabric or non-woven fabric of synthetic fibers and a second base material that is integrally bonded with the first base material, contains different fibers than the first base material, and has a higher initial tensile resistance value than the first base material, wherein the initial tensile resistance value is the value shown for tensile strength when a cloth with a prescribed shape is pulled under prescribed conditions with a prescribed tensile testing machine and the cloth is elongated by 5%.

12. The airbag device according to claim 11, wherein the airbag device is a side airbag device provided on the side of a vehicle seat and wherein the cushion expands and deploys towards the direction of the occupant in the vehicle seat.

13. The airbag device according to claim 12, wherein the second base material of the airbag cover is provided along the side of the vehicle seat so as to contact the seat frame built into the vehicle seat, and is formed to function as a counterforce surface to receive counterforces from the seat frame during expansion and deployment of the cushion.

14. The airbag device according to claim 11, wherein the airbag device is a curtain airbag device in which the cushion expands and deploys along the side walls of the vehicle body in the vehicle cabin.

15. The airbag device according to claim 14, wherein the second base material of the airbag cover is provided so as to contact the side wall of the vehicle body and is formed to function as a counterforce surface to receive counterforces from the side wall of the vehicle body during expansion and deployment of the cushion.

16. A manufacturing method of an airbag cover that encloses a bag-shaped cushion that is wound or folded and stowed in a vehicle cabin that expands and deploys using gas supplied from a built-in inflator, comprising a first base material made up of a plain woven fabric or non-woven fabric of synthetic fibers and a second base material that contains different fibers than the first base material and has a higher initial tensile resistance value than the first base material, wherein the initial tensile resistance value is the value shown for tensile strength when a cloth with a prescribed shape is pulled under prescribed conditions with a prescribed tensile testing machine and the cloth is elongated by 5%, such that the first base material and the second base material partially overlap and the overlapping portion is integrally bonded by thermal fusing.

17. The manufacturing method of the airbag cover according to claim 16, wherein thermal fusing is performed at a higher temperature than the melting temperature of either the first base material or the second base material.

18. The manufacturing method of the airbag cover according to claim 16, wherein a pressing process is added to the thermal fusing.

19. The manufacturing method of the airbag cover according to claim 16, wherein the second base material includes fibers having a melting point that differs by 30° C. or more from the melting point of the fibers included in the first base material.

* * * * *